(12) United States Patent
Schneider et al.

(10) Patent No.: US 7,645,115 B2
(45) Date of Patent: Jan. 12, 2010

(54) SYSTEM, METHOD, AND APPARATUS FOR A POWER PRODUCING LINEAR FLUID IMPULSE MACHINE

(76) Inventors: Abraham Daniel Schneider, 1723 Brook Meadow Ct., Grapevine, TX (US) 76051; Daniel Jacob Schneider, 1723 Brook Meadow Ct., Grapevine, TX (US) 76051

(*) Notice: Subject to any disclaimer, the term of this patent is extended or adjusted under 35 U.S.C. 154(b) by 0 days.

(21) Appl. No.: 11/695,358

(22) Filed: Apr. 2, 2007

(65) Prior Publication Data

US 2007/0231129 A1 Oct. 4, 2007

Related U.S. Application Data

(60) Provisional application No. 60/788,670, filed on Apr. 3, 2006, provisional application No. 60/788,646, filed on Apr. 3, 2006.

(51) Int. Cl.
*F03B 9/00* (2006.01)
(52) U.S. Cl. .................. 415/3.1; 415/5; 416/7
(58) Field of Classification Search .............. 415/3.1, 415/4.2, 5, 219.1, 220, 221, 906; 416/7, 416/8; 290/54, 43
See application file for complete search history.

(56) References Cited

U.S. PATENT DOCUMENTS

| | | | |
|---|---|---|---|
| 206,289 A * | 7/1878 | Alger | 415/5 |
| 685,016 A * | 10/1901 | Towsley | 415/5 |
| 763,623 A | 6/1904 | Nance | |
| 981,514 A * | 1/1911 | Ames | 415/5 |
| 1,481,397 A * | 1/1924 | Tetetleni | 415/4.1 |
| 1,847,855 A * | 3/1932 | Young | 415/5 |
| 2,201,615 A * | 5/1940 | La Mont | 290/4 R |
| 3,270,805 A * | 9/1966 | Glucksman | 165/122 |
| 4,049,300 A | 9/1977 | Schneider | |
| 4,182,123 A * | 1/1980 | Ueda | 60/325 |
| 4,198,875 A | 4/1980 | Schneider | |
| 4,288,985 A * | 9/1981 | Dyck | 60/398 |
| 4,350,474 A * | 9/1982 | Murphy | 416/7 |
| 4,563,168 A | 1/1986 | Schneider | |
| 4,642,022 A * | 2/1987 | Rydz | 415/5 |
| 4,809,498 A * | 3/1989 | Giffin et al. | 60/39.162 |

* cited by examiner

*Primary Examiner*—Edward Look
*Assistant Examiner*—Nathaniel Wiehe
(74) *Attorney, Agent, or Firm*—Bracewell & Giuliani LLP

(57) ABSTRACT

A linear fluid impulse engine enables efficient conversion of the kinetic energy of large volume flows of fluid at low velocity into useful work. The linear fluid impulse engine uses symmetrically curved blades that are mounted to continuous power transmission belts that revolve on a pair of axles. The blades move in substantially linear paths on both the upstream and downstream sides of the inter-axle plane, which extends between the axes of the shafts. A linear cascade of stationary mid-plane guidevanes, located between the two sets of moving blade cascades, acts as a row of nozzles, accelerating the fluid so that it interacts with the downstream blade cascade with the proper velocity characteristics of an impulse device. Water entering the upstream blade cascade may be accelerated by stationary guidevanes to enable impulse operation.

15 Claims, 7 Drawing Sheets

SYSTEM, METHOD, AND APPARATUS FOR A POWER PRODUCING LINEAR FLUID IMPULSE MACHINE

This application claims priority to and the benefit of U.S. Provisional Patent App. No. 60/788,670, entitled Fluid-Driven Translating Power Producing Apparatus, and U.S. Provisional Patent App. No. 60/788,646, entitled Hydropower Production System, both of which have a filing date of Apr. 3, 2006.

BACKGROUND OF THE INVENTION

1. Technical Field

The present invention relates in general to generating power from a fluid source and, in particular, to an improved system, method, and apparatus for a linear hydraulic impulse engine for producing power via impulse fluid-driven translation.

2. Description of the Related Art

A substantial need exists for a means to produce power in an ecologically and economically sustainable manner. Hydraulic turbomachinery has seen widespread use for over a hundred years, but most conventional equipment is optimally suited for high head application, where environmental impacts may be severe. Equipment designed to produce power from low heads have typically been highly expensive, and unsuited for very low heads, such as settings with less than 3 meters of head. If a suitable low head hydropower technology was available, a large number of existing dams, used for non-power purposes such as flood control, navigation, and irrigation, could be retrofitted to provide renewable energy with minimal environmental impact.

Two main classes of devices for converting fluid motion into useful shaft work are reaction and impulse machines. Reaction machines utilize a pressure drop across the moving blades. In an impulse machine, the entire pressure drop occurs before the fluid interacts with the moving blade, so pressure is constant across the moving blades.

A favorable characteristic of impulse machines is their ability to maintain a consistent efficiency over a wide range of flow rates, without the need for complicated mechanisms to adjust blade or fluid angles. In contrast, the efficiency of reaction machines, such as propeller turbines, deteriorates rapidly as the flow rate deviates from the optimum, unless provisions are made to adjust the blade and/or fluid angles, such as is done with Kaplan turbines. Kaplan turbines utilize actuators to swivel the turbine blades as well as inlet guide-vanes, to maintain high efficiency as flow rates change. However, these mechanisms significantly increase the cost of the turbines.

A common impulse machine is the Pelton turbine, which is commonly used to produce hydropower at high heads. The Pelton turbine is not used at low heads because it has a low specific speed. Another common impulse machine is the Cross-flow turbine, which can be used over a wide range of heads. However, the Cross-flow turbine is limited in size at low heads, and it must be carefully designed to avoid the situation in which the level of water in the tailrace or draft tube rises high enough to touch the blades, because efficiency would drop quickly under such a scenario.

Most turbomachinery in use utilizes a configuration in which a multitude of blades are attached to a single, central shaft. However, several devices have been conceived that utilize a form factor in which blades are mounted to a belt or chain and travel in linear paths around a pair of parallel axles. These devices may be referred to as "linear hydraulic machines." A significant advantage of this form factor is that the cross-sectional area, which is rectangular, can be increased without affecting the radius of rotation of the blades. In this manner, a relatively large amount of flow can be utilized while independently controlling the rotational speed of the shafts, and the linear speed of the blades.

One such type of water-operative linear hydraulic machine is disclosed in Swiss Pat. No. 313850 to Eberhard. In that device the blades that contribute to power output travel in the same direction as the fluid flow 50% of the time and during such time contribute to power output. In the second operational stage they move counter to the direction of fluid flow. However, the efficiency of that apparatus is low because only one stage is utilized, and the second stage contributes to drag effects.

In U.S. Pat. No. 763,623 to Nance, the foils in the second stage are situated to receive direct input of fluid as well as fluid directed from the front foils after glancing off of them. Nance suffers from a turbulent confluence of the air that is influenced by one foil to the next foil, due to the disruption of the laminar flow of fluid. Nance further suffers in that the two streams of fluid, instead of working together and becoming confluent, are disrupted and agitated, causing a confused fluid environment when the two streams strike each other at the second stage.

Improvements to these older designs are disclosed in U.S. Pat. No. 4,049,300 to Schneider. However, the linear hydraulic machine described in that patent utilizes reaction foils, operating with the principle of lift. Because the moving foils in this system are asymmetrically shaped, only one stage of the foils can be optimally configured, without the use of complicated mechanisms to re-orient the position of foils in one stage versus the other. Thus, one objective of the present invention is to provide an improved system, method, and apparatus for a linear hydraulic impulse machine that performs well at low heads and is simple to manufacture.

SUMMARY OF THE INVENTION

Embodiments of a system, method, and apparatus for producing power from a fluid impulse source addresses a significant challenge in the capture of low-head fluid power resources, such as low-head hydropower. The invention enables power to be produced with high efficiency, and maintains high efficiency despite changes in the amount of fluid passing through the engine. The invention also provides an improved blade design for linear hydraulic engines, which are inexpensive to manufacture.

The invention has numerous advantages over prior art, fluid-driven translating power producing designs. The implementation of impulse principles in the design and operation of the invention allows the engine to maintain high efficiency over a broader range of flows than conventional reaction machines. The impulse principle enables the blades to be symmetrical, which enables the trailing edge on the upstream stage to act without loss of efficiency as the leading edge on the downstream stage. The invention is essentially free from cavitation, and fluid pressure within the apparatus is maintained at a high fraction of atmospheric pressure. Moreover, the impulse principle causes the majority of resultant forces on the blades to be directed substantially in the direction of blade travel. The moving impulse blades experience little drag force, so frictional losses are minimal.

The invention may be configured for use in open flow (e.g., river or ocean current or confined flow (e.g., a dam). The invention is robust to difficult environmental conditions, such as water with a high level of suspended sediment particles. In addition, the invention produces power while maintaining pressure and velocity conditions within the fluid commensurate with biological organisms' vital needs. For example, the invention is designed to be fish-friendly when utilized in a water environment.

In one embodiment, the invention provides an improved low-head hydropower production system using confined-flow, linear translating-type fluid impulse engines. The invention enables efficient orientation of fluid flow, with a minimum of complexity and cost. The invention also enables improvements in safe passage of fish through the hydropower plant. Additionally, the invention allows for the free passage of suspended solid particulates, including silt, sand, gravel, and small rocks, with minimal damage to the hydraulic machinery. The invention further enables reduction of the range of hydrostatic pressures in the plant. The invention also reduces hydropower plant construction costs by substantially reusing draft tubes at old or existing hydropower plants when retrofitted with linear translating hydropower engines. Construction costs are further reduced by the invention because the engine requires less excavation of the river bed. The invention also facilitates ease of operation and maintenance by placing the shafts of the engine at a convenient, low elevation relative to ground.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
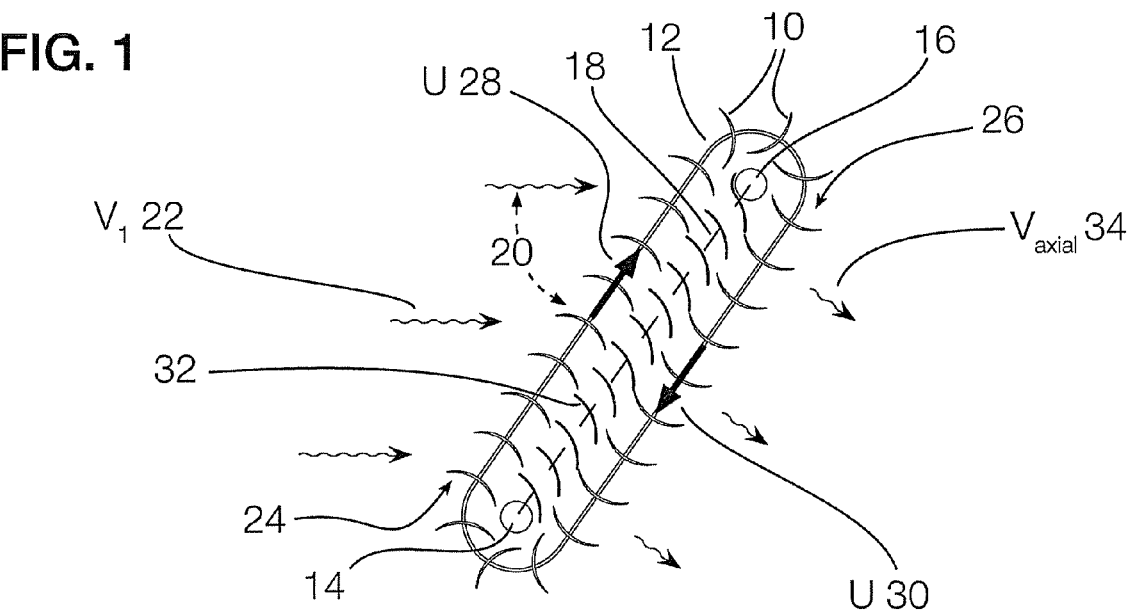
FIG. 1 is a side view of one embodiment of a power producing apparatus constructed in accordance with the invention.

Referring to FIG. 1, one embodiment of an apparatus or engine for producing power from a fluid impulse source utilizes a plurality of symmetrically curved blades 10 mounted to continuous power transmission belts or chains 12. The lateral ends of the blades 10 may be secured to the belts 12, which are mounted about a pair of parallel shafts or axles 14, 16.

An inter-axle plane 18 extends as an imaginary line between the axes of the shafts 14, 16. The inter-axle plane 18 is oriented at a selected angle of inclination 20 relative to the inlet fluid flow, which moves with a velocity, $V_1$, indicated by vector 22. The blades 10 move in substantially linear paths on both sides of the inter-axle plane 18. The blades 10 are grouped into an "upstream blade cascade" 24, and a "downstream blade cascade" 26, and move with a linear velocity, U, in the directions indicated by arrows 28 and 30, respectively. A stationary mid-plane guidevane cascade 32 is located between the upstream blade cascade 24 and the downstream blade cascade 26. After sequentially passing through cascades 24, 32, and 26, the fluid exits the apparatus with an axial velocity, $V_{axial}$, as indicated at outlet fluid flow vector 34.

The blades 10 are symmetrical in cross-section such that their leading and trailing halves are symmetrical with respect to each other. For example, in the embodiment shown, each blade 10 is crescent-shaped and has mirror-image leading and trailing edges. However, the blades also may comprise parallel upper and lower surfaces having the same radius of curvature, and may comprise rectangular edges extending between the parallel upper and lower surfaces. Other symmetrical shapes also may be employed.

In operation, the invention utilizes linearly-moving blades to interact with a moving fluid through the impulse principle. In one embodiment, the general configuration of an engine employing the invention is as follows. A multiplicity of blades is arranged parallel to each other. The two lateral side edges of each blade 10 (FIGS. 1 or 2) are attached to two parallel continuous power transmission belts or chains 12; hereafter simply referred to as "belts." The blades 10 are evenly spaced around the circumference of the belts 12. The belts 12 pass over sprockets mounted on two parallel axles 14, 16, which are mounted in bearings and supported on a frame or housing. For convenience, the term "engine mid-plane" is defined as the plane in which both of the parallel axles 14, 16 are located.

Fluid first enters the upstream cascade of blades 24 with a velocity, $V_1$ 22. Ideally, the fluid vector $V_1$ 22 enters the upstream blade cascade 24 tangent to the leading edges of the moving blades 10. The fluid vector $V_1$ 22 contains both axial velocity as well as velocity in the direction of blade movement 28. As the blades 10 move, torque is produced at the axles 14, 16, and energy is extracted from the moving water. Once the water reaches the trailing edge of the upstream blade cascade 24, some of the velocity component in the direction of blade movement is removed and converted into useful work. At this point, the fluid impinges the mid-plane guidevanes 32, ideally at an angle tangent to their mean camber lines. The mid-plane guidevanes 32 accelerate and turn the fluid flow such that a new vector relationship is established in preparation for interaction with the downstream blade cascade 26. The same vector relationships that applied to the upstream blade cascade 24 also apply to the downstream blade cascade 26.

Figure 2:
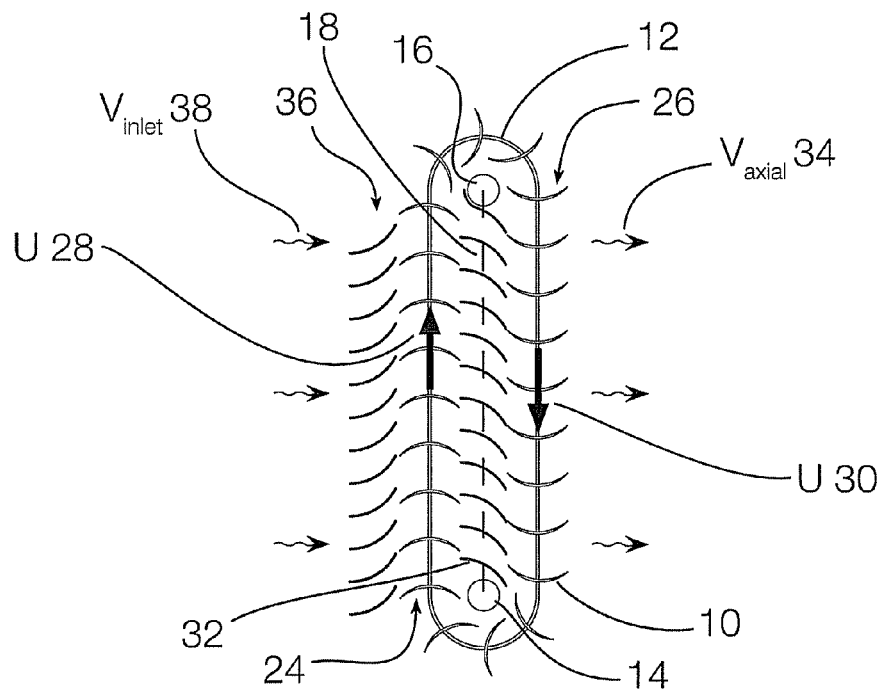
FIG. 2 is a side view of another embodiment of a power producing apparatus constructed in accordance with the invention.

The embodiment illustrated in FIG. 2 has an inter-axle plane 18 that is perpendicular to the upstream, inlet fluid flow vector 22, which moves with a velocity $V_{inlet}$ 38. This embodiment employs a cascade of fixed guidevanes 36 that are located upstream of the upstream blade cascade 24. Thus, like mid-plane guidevane cascade 32, fixed guidevanes 36 are stationary relative to the two moving cascades 24, 26. The fixed inlet guidevanes 36 redirect and accelerate the inlet flow so that it enters the upstream blade cascade 24 with the same velocity $V_1$ 22 as in FIG. 1. Other than its perpendicular orientation relative to inlet fluid flow vector 38 and its additional set of fixed guidevanes 36, this embodiment is identical to the previous embodiment.

Figure 3:
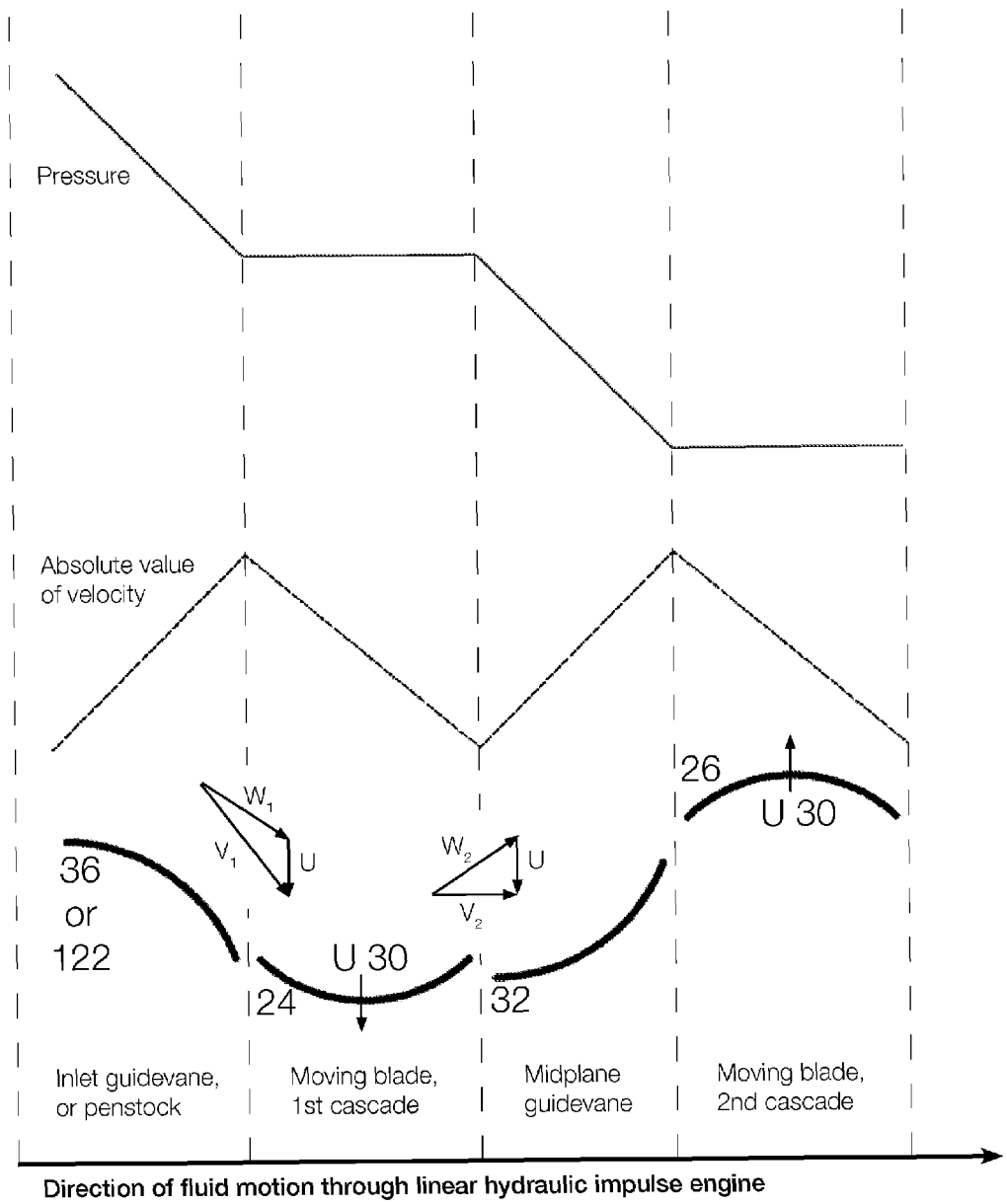
FIG. 3 is a schematic diagram illustrating pressure and fluid vector relationships for one embodiment of the invention.

FIG. 3 illustrates the relationships between fluid pressures and velocities as a function of the location of the fluid in the linear hydraulic impulse engine. Because the invention utilizes the impulse principle, the entire pressure drop in the fluid occurs prior to the fluid entering each respective cascade of moving blades 24, 26. This means the maximum absolute fluid velocity is attained by the fluid just upstream of the moving blade cascades. Specifically, the maximum fluid velocity $V_1$ is attained at the outlet of the inlet guidevane cascade 36, or penstock, 122 (if designed without inlet guidevanes) for the upstream blade cascade 24; and at the outlet of the midplane guidevane cascade 32 for the downstream blade cascade 26. As FIG. 3 illustrates, no pressure drop occurs within each of the two moving blade cascades. Since no pressure drop occurs within either of the moving blade cascades, cavitation will not occur in the invention under normal operating conditions.

A fluid impulse engine utilizing impulse blades in accordance with the invention performs optimally when the blades move at approximately half of the speed of the fluid velocity in the direction of blade travel. Therefore, the blades of the invention move at a fraction of the velocity of the flowing water in which they are located. This is in contrast to blades used in reaction devices, which move at multiple times the speed of the flowing water in which they are located.

Because the blades 10 are oriented on continuous belts 12 and the engine is a two-stage machine, the trailing edges of blades 10 (FIGS. 1 and 2) in the upstream cascade 24 become the leading edges of the blades in the downstream cascade 26. Thus it is advantageous to utilize symmetrical blades. Symmetrical blades also fulfill the basic requirement of an impulse device: the fluid velocity relative to the blade at blade entry $W_1$ is of the same magnitude as the fluid velocity relative to the blade at blade outlet $W_2$. This is illustrated by the velocity triangles in FIG. 3.

The velocity and pressure characteristics described above have important beneficial consequences for the design of blades for the linear hydraulic impulse engine. Since the relative velocity is low between the blade and the fluid, the blade resists abrasive erosion in situations where the fluid is laden with abrasive solids such as sand. Also, because the impulse machine does not cavitate, the blades can be manufactured with a rougher surface finish than is required in a reaction device. For example, the blades may be mass-produced in a stamping process. As a result, the blades of the invention are much more economical to manufacture.

These characteristics concerning the velocity and pressure conditions within the invention also have important ramifications for the ecological sustainability of renewable energy produced by the invention. For example, two main causes of morbidity and mortality of fish passing through hydraulic turbines are out-gassing of dissolved gases in the flesh of fish, and direct impact with moving blades. Fish passing through the invention are not exposed to large pressure gradients, nor are they subjected to very low pressures at any point in the engine. Pressure within the fluid passing through the engine is always above the level necessary to maintain health of biological organisms, such as fish, which may pass through the engine without harm.

An important consequence of the impulse principle applied in the invention is that forces on the blades in a direction perpendicular to the blades' motion, such as drag force, are minimized. Practically, there may be either some downstream or upstream component of force, partially related to skin friction, and partially related to local pressure effects near the blades, but the magnitude of this force is small relative to the impulse force in the direction of blade movement.

Furthermore, the efficiency of the invention is robust to changes in the flow during operation. As flow is increased from no-flow up to the rated capacity of the engine, the efficiency quickly attains a high level and maintains this high efficiency across a broad range of flow rates.

Figure 4:
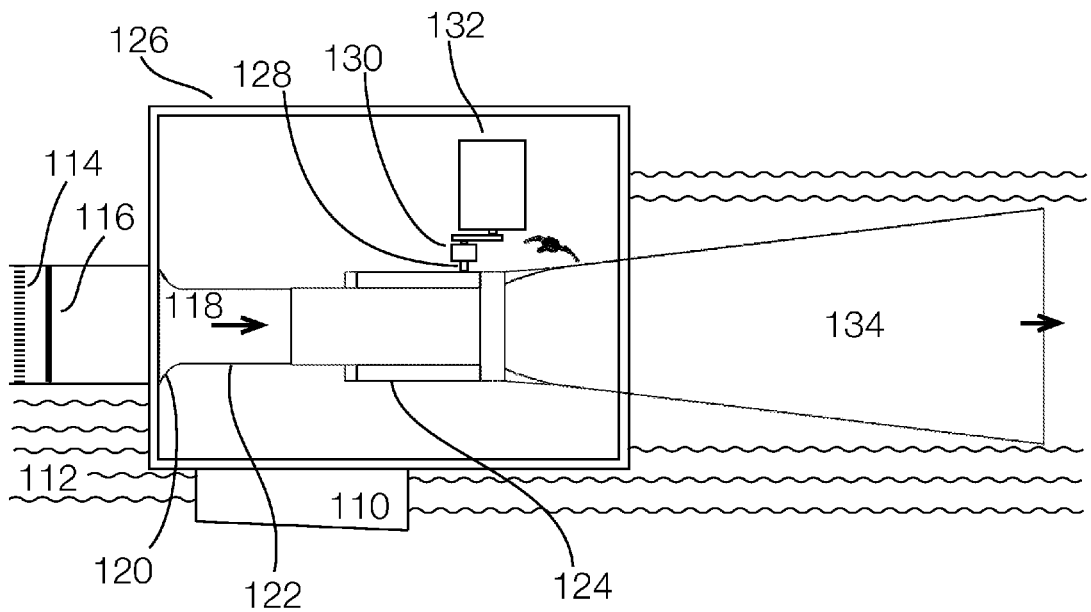
FIG. 4 is a plan view of one embodiment of a hydropower production system constructed in accordance with the invention.
Figure 5:
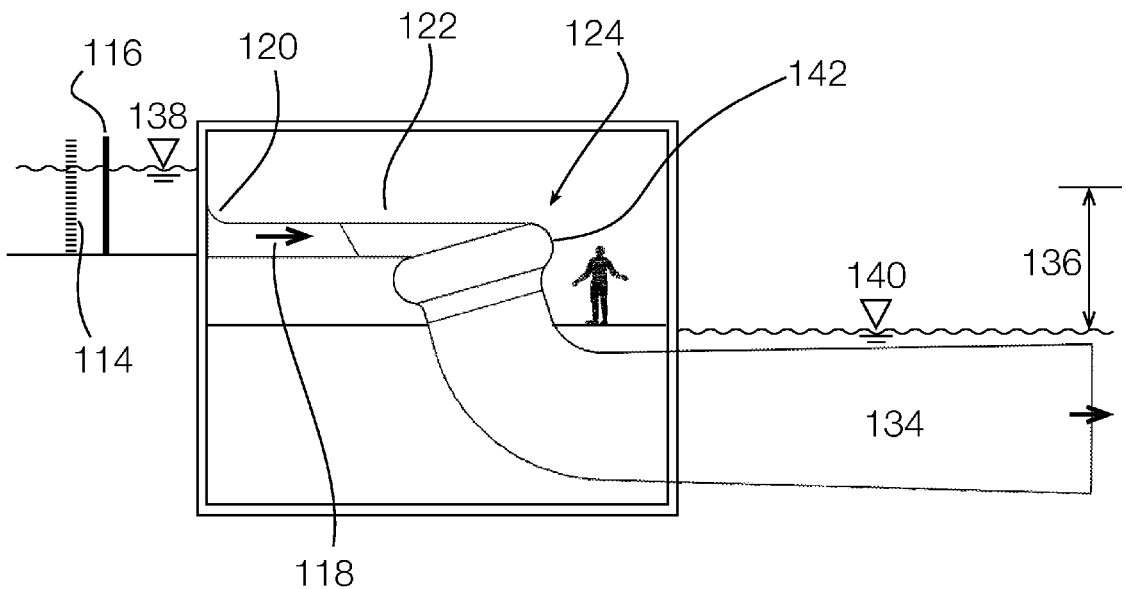
FIG. 5 is a sectional side view of the hydropower production system of FIG. 4 and is constructed in accordance with the invention.

Referring now to FIGS. 4 and 5, one embodiment of a hydropower plant utilizing the invention is shown. A dam or other obstruction 110 creates a barrier across a stream or river 112. A trash rack 114 is located upstream of a control gate 116 that regulates water flow through the plant. Water 118 travels through an entryway 120 and a penstock 122 prior to entering an engine case 142 that contains a linear hydraulic impulse engine 124, both of which are located within a powerhouse 126. The hydraulic engine 124 may comprise any of the embodiments described herein, depending on the application. Torque produced from the hydraulic engine 124 turns a shaft or shafts 128 that may pass through a gearbox or speed increaser 130 (FIG. 4). The generated torque may be utilized to generate electricity with a suitable generator 132, or it can be used directly for mechanical work. As best shown in FIG. 4, a divergent draft tube 134 is connected to the outlet of the hydraulic engine 124. The draft tube 134 may diverge in one or more planes (i.e., laterally, longitudinally, or both) depending on the application.

As shown in FIG. 5, a vertical displacement or head 136 between the upstream water level 138 and the downstream water level 140 is formed by the dam 110. The penstock 122 is oriented in a substantially horizontal configuration before entering the engine case 142 and hydraulic engine 124, which are inclined downward at an acute angle (e.g., 25°) in the embodiment shown relative to the penstock 122 and a horizontal plane. Water exits the hydraulic engine 124 and engine case 142 at a more significant angle (e.g., 65°) relative to the penstock 122 and horizontal. Beneath the engine case 142, the draft tube 134 gently curves so that the water exiting the draft tube 134 is generally parallel to horizontal. However, the specifics of the curve, and whether the draft tube curves at all, are plant design choices included within the scope of this invention. One advantage of a horizontal draft tube exit is that a longer, more efficient draft tube can be accommodated at a low-head site.

In operation, the dam or other obstruction 110 to water flow creates a vertical displacement or head 136 between two bodies of water 138, 140. Water flows from the higher elevation 138 to the lower elevation 140 creating the potential to generate power from the moving water. The intake to the hydropower system is protected by a trash rack 114 to keep large foreign debris (e.g., floating trash, logs, etc.) out of the system. Water flows through a conduit or penstock 122 before entering the linear hydraulic impulse engine 124. Torque produced by the hydraulic engine 124 may be utilized in many ways, including the production of electricity or direct mechanical use. The powerhouse 126 is preferably kept dry, so the gearbox 130 and generator or mechanical equipment 132 can be located in close proximity to the hydraulic engine 124. After moving through the hydraulic engine 124, water exits into a draft tube 134 to decelerate the water flow and increase the efficiency of the system. Finally, water exits the draft tube 134 and returns to the stream 140.

The ability of the invention to utilize a draft tube while operating fully flooded with fluid constitutes a significant advantage over other impulse turbomachinery, such as Cross-flow turbines, when used at low head settings. At low heads, a draft tube is essential to utilize the full head available, but Cross-flow turbines cannot operate with the runner fully flooded with fluid. This constraint restricts the degree to which Cross-flow turbines are suitable for very low head settings. In contrast, the invention can be configured in numerous ways to utilize whatever head is available.

The orientation of the engine shown in FIGS. 4 and 5 produces several additional benefits in the construction, operation, and maintenance of the hydropower plant. The invention enables old or existing hydropower plants to be retrofitted with new, linear translating-type engines, at minimal cost, by largely reusing the old or existing draft-tube excavated volume. The invention requires less excavation during construction because of the shallow depth of the engine. Because the shafts 128 are at similar elevation above the ground, much less excavation is required during the construction of the hydropower plant. The arrangement also simplifies the design of the support structure for torque-take-off equipment, such as gearboxes 130 and electrical generators 132. Also, when the engine requires maintenance, the shafts 128 are at an elevation easily accessed by plant personnel without the need for ladders, pits, or scaffolding.

The invention also enables a reduction in the range of hydrostatic pressures present in the engine. One positive effect of this feature is the enabling of hydraulic engine performance optimization while minimizing the possibility of cavitation. Another benefit is that fish traveling through the system are exposed to a relatively uniform distribution of hydrostatic pressures, thereby further reducing the likelihood of morbidity or mortality.

Figure 6:
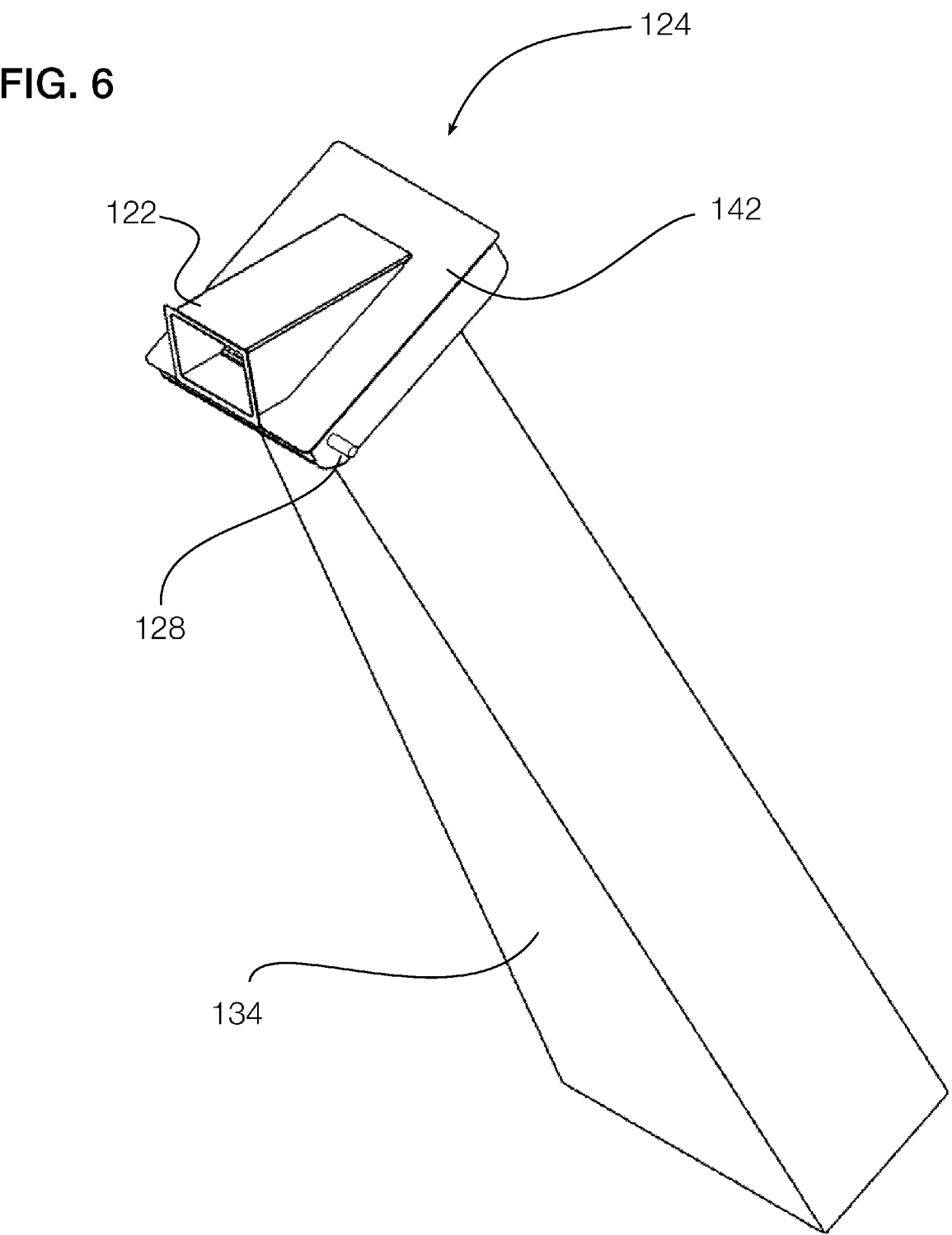
FIG. 6 is an isometric view of another embodiment of a hydropower production system constructed in accordance with the invention.

Referring now to FIG. 6, in an alternate embodiment, the penstock 122 is connected to the linear hydraulic impulse engine 124, which is in turn connected to a draft tube 134. A shaft 128 extends through the case 142, and can be connected to any external power transmission equipment, such as an electrical generator.

Figure 7:
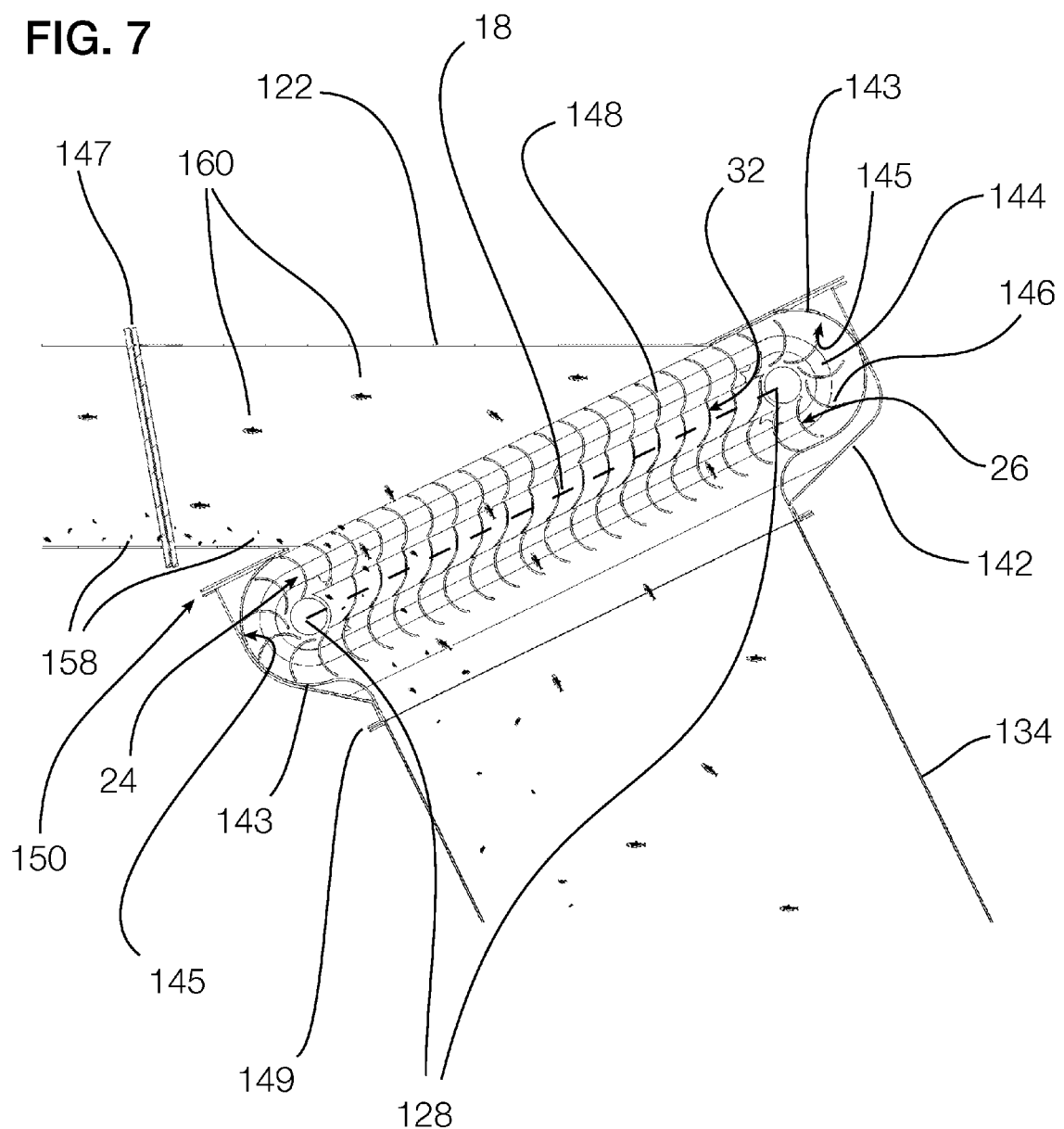
FIG. 7 is an enlarged sectional side view of an embodiment of a linear engine portion of a hydropower production system and is constructed in accordance with the invention.

A cross-sectional diagram of FIG. 6 is shown in FIG. 7. In the embodiment shown, engine shroud 143 comprises an oval shape having a cross-section that is contoured to the outer profile of the moving blades (i.e., a completely rounded rectangle, consisting of two congruent semicircles and two equal and parallel lines). The penstock 122 is oriented to supply a water flow into the case 142 in such a manner as to increase the efficiency of an upstream cascade of blades 24. The maximum diagonal dimension of penstock 122 at its interface with engine shroud 143 is approximately equal to or greater than a distance between axles 128, but less than an overall length of the engine. Similarly, the maximum dimension of draft tube 134 at its interface with engine shroud 143 is approximately equal to or greater than a distance between axles 128, but less than an overall length of the engine. The penstock 122 is equipped with flanges 147 at its termination that allow connection to a conduit of matching rectangular cross section. Similar flanges 149 allow the draft tube 134 to be joined to the engine case 142. The engine case 142 is split 150 to allow the removal of the engine cassette for maintenance or other purposes.

As described herein, the engine case 142 encloses a cassette 144 comprising a plurality of blades 146 attached to a pair of continuous belts 148. The belts 148 are mounted to a pair of parallel shafts or axles 128, which are supported by bearings (not shown). The inter-axle plane 18 is an imaginary line drawn between the axes of the two axles 128. A stationary mid-plane guidevane cascade 32 is located between the upstream cascade of blades 24 and a downstream cascade of blades 26. As shown in FIG. 7, the moving cascades of blades 24, 26 are closely located relative to the inner surfaces 145 (e.g., the semicircular portions) of engine shroud 143. The engine case 142 is connected to the draft tube 134 so that water flowing through the system carries suspended solid material 158, such as sand, gravel, rocks, or stones, through the engine. In addition, fish 160 may pass safely through the engine.

Inside the hydraulic engine, water first enters the upstream cascade of blades 24 (FIG. 7), then passes through the stationary mid-plane guidevanes 32, before passing through the downstream cascade of blades 26. The penstock 122 is of a size and orientation relative to the inter-axle plane 18 such that the water impinges the upstream cascade of blades 24 with the proper hydrodynamic speed and direction required for impulse mode of operation (as described above). The angular orientation of the inlet water stream required by the upstream cascade of blades 24 establishes the relative angle between the inter-axle plane 18 and the centerline of the penstock 122. In this embodiment, since the optimal fluid speed and direction are inherently established in the penstock 122, the system requires no guidevanes upstream of the upstream cascade of blades 24. This has many positive benefits, including simplification of the system, lower cost, lower hydrodynamic efficiency losses, and the elimination of pinch points between guidevanes located upstream from the upstream cascade of blades. Thus, fish moving through the engine will be exposed to substantially fewer hazards.

In another embodiment, the penstock 122 is either horizontal, or substantially parallel to the shallow stream gradient. This configuration causes the angle of the inter-axle plane 18 with respect to horizontal to be very shallow as well. As a result, suspended sediment, including silt, sand, gravel, and small rocks being carried along with the water will travel out and over the lower axle 128 of the engine. The direction of motion of the moving blades carries suspended solid particles towards the center of the engine and away from the lower boundary, allowing these particles to pass freely through the engine and out into the draft tube 134 without accumulating in the engine.

In alternate embodiments, the inter-axle plane may be placed at any arbitrary angle relative to ground with the penstock tilted up at a commensurate angle, while still maintaining the necessary relative angle between the inter-axle plane and the centerline of the penstock. For example, the axles may be oriented in the same vertical plane. This embodiment may be desirable for applications where there is very little or no suspended sediment in the inlet water. In this application, sediment collection in the bottom of the engine is insignificant and the system configuration is optimized for other constraints, such as excavation of the draft tube. Moreover, the shape of the draft tube centerline and dimensions of the draft tube cross-sectional area may be designed to fit the requirements of any site. Furthermore, the inlet of the penstock may be of any appropriate shape and angular position provided that the speed and direction of the water entering the upstream cascade of blades is as required for impulse operation.

Figure 8:
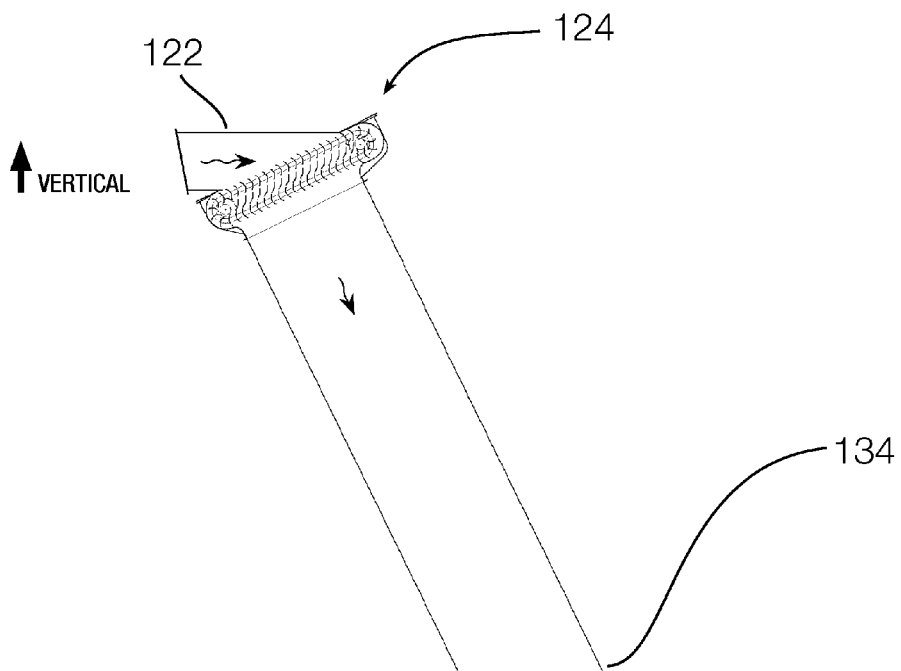
FIGS. 8-10 are sectional side views of other embodiments of hydropower production systems constructed in accordance with the invention.
Figure 9:
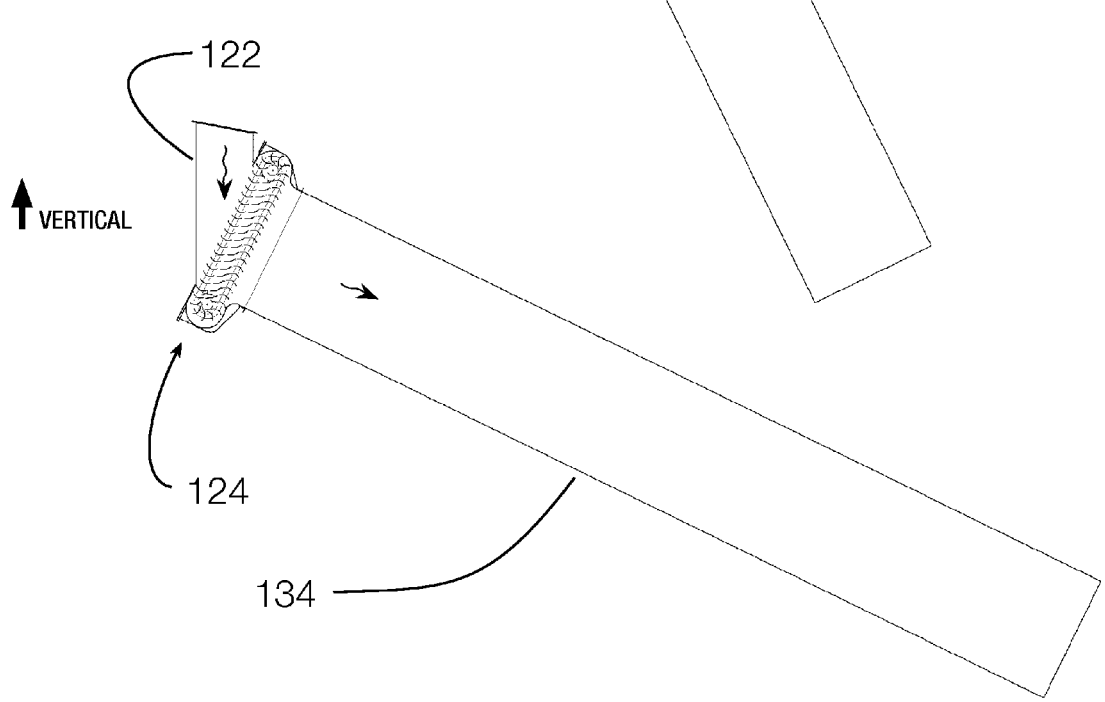
Figure 10:
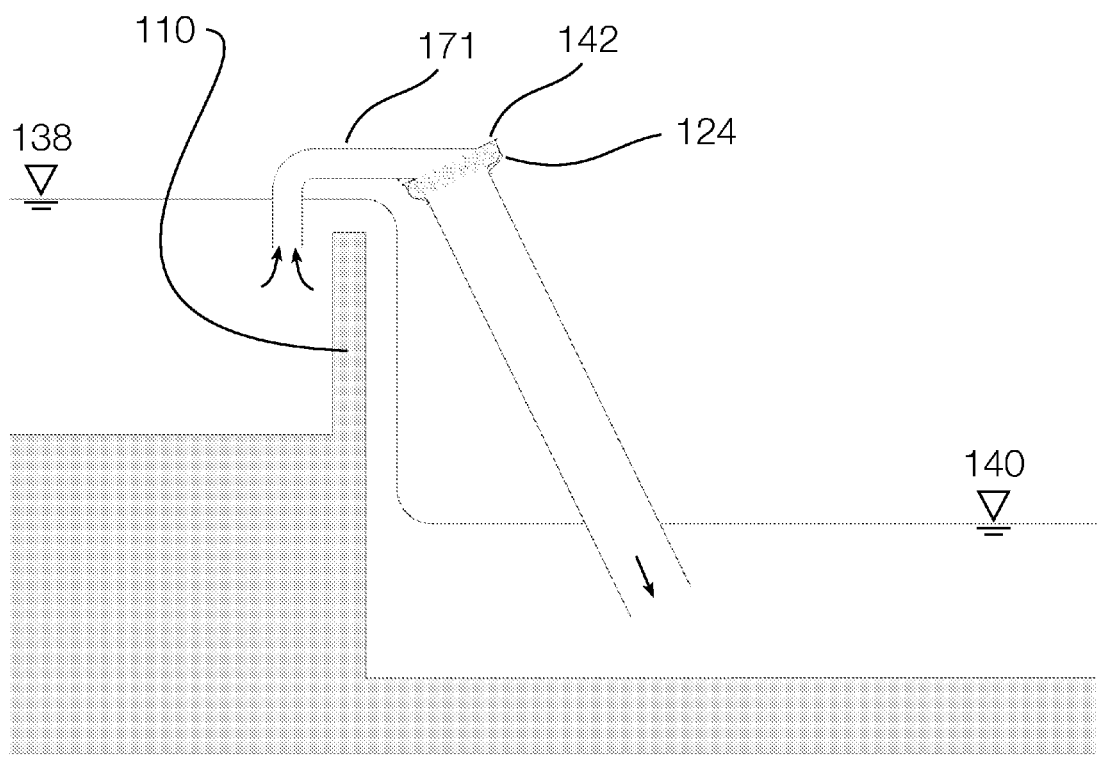

In still other alternate embodiments, the penstock 122 leading to the engine 124 (FIGS. 8-10) may be positioned almost anywhere in relation to (e.g., communicating through) a dam or other obstruction for a body of water. For example, FIG. 9 illustrates a configuration in which the upstream cascade of blades is impinged by a substantially vertically downward flow of water, and the water flow exits the engine 124 at an acute angle (e.g., 25°) relative to horizontal. In FIG. 10, similar geometry is used, but with a siphon intake 171 that extends over the top of an obstruction 110 to supply a water flow to the engine 124, after which the water flow exits at an acute angle via a draft tube. These embodiments may utilize engine cases and shrouds as described above, and may include substantially vertical or horizontal delivery of water flow to the engine, as well as any incremental angle between vertical and horizontal that is desired in the particular setting. In one embodiment, the penstock and linear hydraulic engine are located above the upper water level 138 (FIG. 10); in others, the linear hydraulic engine may be located between the upper water level 138 and lower water level 140.

While the invention has been shown or described in only some of its forms, it should be apparent to those skilled in the art that it is not so limited, but is susceptible to various changes without departing from the scope of the invention. For example, the principles of impulse operation applied to linear fluid engines apply equally to confined-flow as well as open-flow fluid power conversion engines. The invention may be configured for open-flow situations, such as river or ocean current applications, or used in confined-flow, single direction applications, such as at a low dam on a river, where the engine would operate within a system including a penstock and draft tube. In addition, the invention is shown with clock-wise rotation, but the device may be configured to operate in a counter-clockwise direction if so desired, without altering any of the operating principles described above. The angular orientation of the engine case can be any arbitrary value, as long as the velocity relationships required for impulse operation are provided.

What is claimed is:

1. A system for providing hydropower from a body of water, comprising:
    a penstock for delivering a flow of water from the body of water;
    an engine case having an inlet in fluid communication with the penstock for receiving the flow of water, the engine case having a single outlet opposite the penstock for delivering the flow of water such that the flow of water between the inlet and the single outlet is confined within the engine case;
    a draft tube in fluid communication with the outlet of the engine case for receiving the entire flow of water from the engine case;
    a linear fluid impulse engine located in the engine case and extending in a substantially parallel plane relative to the engine case, the linear fluid impulse engine comprising:
    a pair of shafts having parallel axes spaced apart from each other along an inter-axle plane that extends through both axes;
    a plurality of continuous conveyors coupled to the shafts and defining upstream and downstream sides that are immediately adjacent the inter-axle plane;
    a plurality of moving curved blades having lateral ends that are mounted to the continuous conveyors, the moving curved blades being evenly spaced apart from each other about a circumference of the continuous conveyors, and wherein the moving curved blades move in substantially linear paths along the upstream and downstream sides of the inter-axle plane; and
    a stationary cascade of mid-plane guidevanes located along the inter-axle plane immediately adjacent to and between the moving curved blades on the upstream and downstream sides of the continuous conveyors.

2. A system according to claim 1, wherein the penstock has an outlet oriented to direct the water flowing into the moving curved blades on the upstream side at a selected angle; and
    the guidevanes are oriented to direct the water into the moving curved blades on the downstream side at substantially the same angle.

3. A system according to claim 1, wherein the draft tube has an inlet portion that joins the outlet of the engine case, the inlet portion of the draft tube being substantially perpendicular to the inter-axle plane.

4. A system according to claim 1, wherein the engine case comprises an engine shroud having a shape that is contoured to an outer profile of the linear fluid impulse engine, the shape comprising in cross section two semicircles joined to each other by two equal and parallel lines.

5. A system according to claim 1, wherein the water undergoes a first pressure drop as it flows from the penstock into the moving curved blades on the upstream side and a second pressure drop as it flows through the mid-plane guidevanes, and there is substantially no pressure drop occurring as the water flows through the moving curved blades along the upstream and downstream sides of the inter-axle plane.

6. A system according to claim 1, further comprising a stationary cascade of upstream guidevanes located adjacent to but spaced apart from the moving curved blades on the upstream side.

7. A system according to claim 6, wherein the stationary cascade of upstream guidevanes comprises a plurality of curved guidevane blades that are evenly spaced apart from each other in a direction parallel to the inter-axle plane.

8. A system according to claim 1, wherein the moving curved blades have midsections between inner and outer edges, the portion of each of the moving curved blades from its midsection to its outer edge being symmetrical relative to the portion of each of the moving curved blades from its midsection to its inner edge.

9. A system according to claim 1, wherein the assembly of the penstock, the engine case, and the draft tube comprises a siphon intake that supplies the water flow over a top of an obstruction.

10. A system according to claim 9, wherein the penstock has an intake in a body of water that has an upper water level and the linear fluid impulse engine is located above the upper water level.

11. A system according to claim 1, wherein:
    the penstock has an intake in a body of water that has an upper water level and the draft tube delivers the water flowing through the engine case to a body of water that has a lower water level; and
    the linear fluid impulse engine may be located above the upper water level or at any selected point between the upper water level and the lower water level.

12. A system for providing hydropower from a body of water, comprising:
    an engine case having an inlet on one side and a single outlet on an opposite side such that water flowing through the engine case is confined between the inlet and the outlet;
    a penstock coupled to the inlet of the engine case for delivering a flow from a body of water into the engine case;
    a draft tube coupled to the outlet of the engine case for receiving the entire flow of water from the engine case;
    a linear fluid impulse engine located in the engine case and comprising:

a pair of shafts having parallel axes spaced apart from each other along an inter-axle plane that extends through both axes;

a plurality of continuous conveyors coupled to the shafts and defining upstream and downstream sides that are immediately adjacent the inter-axle plane; and a plurality of moving curved blades having midsections between inner and outer edges, the portion of each of the moving curved blades from its midsection to its outer edge being symmetrical relative to the portion of each of the moving curved blades from its midsection to its inner edge; and a stationary cascade of mid-plane guidevanes located along the inter-axle plane immediately adjacent to and between the moving curved blades on the upstream and downstream sides of the continuous conveyors; and wherein the pressure of the water as it flows through the moving curved blades on the upstream side and through the moving curved blades on the downstream side undergoes substantially no pressure drop.

13. A system according to claim 12, wherein the pressure of the water drops as it flows through the penstock and through the mid-plane guidevanes.

14. A system according to claim 12, wherein the penstock has an outlet oriented to direct the water flowing into the moving curved blades on the upstream side at a selected angle; and the guidevanes are oriented to direct the water into the moving curved blades on the downstream side at substantially the same angle.

15. A system according to claim 12, wherein:

the penstock has an intake in a body of water that has an upper water level and the draft tube delivers the water flowing through the engine case to a body of water that has a lower water level; and the linear fluid impulse engine may be located above the upper water or at any selected point between the upper water level and the lower water level.

* * * * *